United States Patent [19]
Drob

[11] Patent Number: 5,743,714
[45] Date of Patent: Apr. 28, 1998

[54] METHOD AND APPARATUS FOR MINIMUM WORK CONTROL OPTIMIZATION OF MULTICOMPRESSOR STATIONS

[75] Inventor: Dmitry Drob, P.O. Box 12848, Houston, Tex. 77217

[73] Assignee: Dmitry Drob, Fort Collins, Colo.

[21] Appl. No.: 626,806

[22] Filed: Apr. 3, 1996

[51] Int. Cl.[6] .................................................. F04B 49/00
[52] U.S. Cl. ........................... 417/2; 417/5; 417/44.1; 417/44.2; 415/1
[58] Field of Search ........................ 417/1–8, 18–20, 417/22, 32, 43, 44.1, 44.2, 44.3, 45, 53; 415/1, 17, 27, 28; 364/551.01, 431.02

[56] References Cited

U.S. PATENT DOCUMENTS

| | | |
|---|---|---|
| 4,384,818 | 5/1983 | Blotenberg ......................... 415/1 |
| 4,464,720 | 8/1984 | Agarwal ............................ 415/1 |
| 4,640,665 | 2/1987 | Staroselsky et al. ............... 415/1 |
| 5,108,263 | 4/1992 | Blotenberg ...................... 417/53 |
| 5,347,467 | 9/1994 | Staroselsky et al. ............... 415/1 |
| 5,508,943 | 4/1996 | Batson et al. .................... 415/1 |

*Primary Examiner*—Charles G. Freay
*Assistant Examiner*—Xuan M. Thai

[57] ABSTRACT

A method and apparatus are disclosed for controlling a multicompressor station so that the overall work requirement of the station is minimized while maintaining the compressors in a non-surge conditions. The apparatus includes interconnected control loops for controlling the turbine speed of variable speed compressors or the throttling valves of constant speed compressors that determine a set of criterion for computing the value and sign of the first derivative of work performed by the station. The speed of each compressor is then set to reduce overall system work while maintaining discharge pressure of the station and maintaining the compressors in a non-surge operating format. The method includes the steps of computing the criterion, computing the value and sign of the first derivative of the work function and adjusting the compressor speed to minimize station work while maintaining the compressors in a non-surge condition.

15 Claims, 5 Drawing Sheets

METHOD AND APPARATUS FOR MINIMUM WORK CONTROL OPTIMIZATION OF MULTICOMPRESSOR STATIONS

FIELD OF THE INVENTION

The present invention relates generally to a method and apparatus for controlling multicompressor work stations to minimize overall system energy consumption while optimizing system resource allocations.

More particularly, the present invention relates to a method and apparatus for controlling multiple compressors working in parallel or series which enables all of the load sharing controllers to carry their optimum share of the load and minimize overall system energy consumption, while maintaining the compressors in non-surge limit operation.

BACKGROUND OF THE INVENTION

Conventional load-sharing techniques for multiple compressors generally provide for equidistant operation from surge control lines for all participating compressors. Such conventional load-sharing techniques are disclosed and described in patents and publications. U.S. Pat. No. 4,640,665 discloses a method for controlling a compressor station where each compressor is maintained at a predetermined value for its surge control line. Several publications also discuss and describe conventional load-sharing techniques including the following: "Multiple Compressors Systems," Unit 9-4 entitled "Multiple Compressors in Parallel," Ralph L. Moore, pp. 244–251; "Centrifugal Compressor Control Considerations", Application Note, MICON, R. Rammler and D. Lupfer; M. H. White, "Surge Control for Centrifugal Compressors," Chemical Engineering, 1972, 12, 25; and "More Effective Control for Certifugal Gas Compressors Operating in Parallel," Compressor Control Corp., Technical Paper TP17, N. Staroselsky and L. Ladin.

These conventional control procedures are designed to maintain each compressor at some predetermined value from its surge line, but they do not provide for minimum work performed per mass gas for the compressor system. Thus, an object of this invention is to provide a method and apparatus for compressor control in multi-compressor stations that would minimize work performed per mass gas and decrease overall system energy consumption.

SUMMARY OF THE INVENTION

The present invention provides a method and apparatus that enables load-sharing compressors to carry their optimum share of a total flow without risking surge in any of the compressors.

The apparatus of the present invention is a control system for a multi-compressor station that includes a plurality of compressors with associated governors and prime movers, such as turbines, for varying the performance of each compressor. The turbine speed is in turn controlled by three interconnected means for controlling the compressors, so-called control loops. The three interconnected control loops work in concert to maintain the compressors in a non-surge condition and simultaneously optimize an overall station energy consumption by re-allocating station capacity so that the more efficient compressors make greater contributions to station capacity than less efficient compressors.

The first means for controlling the compressors or first control loop for each compressor is an antisurge control means or loop. This first loop prevents the performance of each compressor from crossing a pre-established, safe operating condition or a pre-determined, surge control line (SCL) by operating an antisurge recycle or blow-off valve associated with each compressor. This first loop also computes two criteria: (1) a DEV value which represents a distance between each compressor's operating point and the SCL or a deviation from the SCL for each compressor and (2) an INCR value which represents an increment of a system work performed based on a step upset of a mass flow balance between the compressors. Each compressor has its own antisurge control loop, and therefore, there is a DEV value and an INCR value for each compressor.

The second means for controlling the compressors or second control loop is an automatic pressure cascade system or is a cascaded series of pressure control loops including a plurality of load-sharing control loops (one for each compressor in the station), a primary master station controller which establishes set points for the load-sharing control loops and a means for computing a dW value or dW module which computes a station differential work value, $\Delta W$ or dW, from the INCR values computed by each antisurge control loop and transmitted to the dW module. The load-sharing control loops are responsible for changing compressor performance, and consequently, computing the DEV and INCR values for the various compressors in the station at given intervals or scans.

Each load-sharing control loop of the present invention includes a DEV balancing PIC control loop, a pendulum module, an SIC control loop, and a means for optimizing station efficiency. The means for optimizing station efficiency is a logic control module which determines whether the operating point of a given compressor in a "close" condition or in a "distant" condition based on the compressor's DEV value.

If the DEV value is in the close condition, then the DEV balancing PIC loop controls the set point for the SIC control loop which adjusts the prime mover speed to cause the DEV not decrease or come closer to the SCL of that compressor, while maintaining the overall discharge pressure. If the DEV value is in the distant condition, then the pendulum module controls the set point of the SIC control loop which adjusts the prime mover speed so that the absolute value of $\Delta W$ decreases, while maintaining the overall discharge pressure.

BRIEF SUMMARY OF THE DRAWINGS

For a more complete understanding of the present invention and the features and advantages thereof, reference is now made to the Detailed Description in conjunction with the attached Drawings, in which like parts are given like reference numerals and wherein.

DETAILED DESCRIPTION OF THE PREFERRED EMBODIMENT

The energy consumption of parallel or series configured compressor in compressor stations can be significantly reduced by using a cascade control including a pressure control loop, load sharing control loops, load control loops, and antisurge protective loops, with the antisurge loops having associated computing modules to calculate an additional criterion representing an increment of a system work performed per step upset of a mass flow balance between compressors, and with additional logic modules for smooth transition of the load-sharing control loops between equalizing "deviation of operation point from the surge control line" for all parallel or series compressors, when the deviation is below an arbitrary nominated threshold "close", and minimizing "increment of the system work performed", when the deviation is above an arbitrary nominated threshold "distant".

To illustrate the advantages of the present invention over conventional control technology, one may have two equal compressors operating in parallel, but a suction (or discharge) pipeline for compressor #2 is longer than for a suction pipeline (or discharge) for compressor #1. Because one of the pipelines for the two compressors is longer, it will create more resistance for a gas flow from compressor #2. If the two compressors are operated at equal mass flow, then because compressor #2 has additional gas flow resistance associated with its suction (or discharge) pipeline, compressor #2 will have to operate at a higher rotational speed and at a higher compression ratio in order to deliver the same mass flow as compressor #1.

Figure 1A:
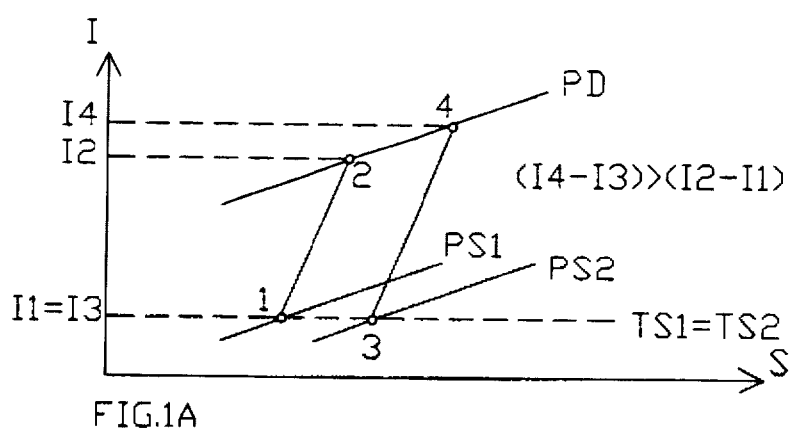
FIG. 1a is a Mollier chart (Thermodynamic Properties chart) of a gas compression process for two equal compressors running in parallel with equal mass flow and with unequal compression ratios, i.e., Ps2<Ps1 and Pd1=Pd2.

For equal compressors, a higher compression ratio for the same flow means less deviation from the surge. This condition is illustrated in FIG. 1, which shows the compression process in "i-S" (enthalpy-entropy) coordinates for compressor #1 (line 1-2) and for compressor #2 (line 3-4). It can be seen from the profiles in FIG. 1a that compressor #1 takes less energy (i2-i1) to deliver a unit of mass flow to a system discharge pressure, Pd, than compressor #2 (i4-i3).

With a conventional load-sharing control system, the system would operate in such as way as to accelerate the compressor #2, the less efficient compressor, and decelerate compressor #1, the more efficient compressor, in order to equalize their deviation from surge. With the control system of the present invention which is designed to minimize the system work performed, the control system would accelerate the compressor #1, the more efficient compressor, assuming a starting point with equal mass flow.

Another example of a conventional control technology is illustrated when pipelines are equal for compressors #1 and #2, but compressor #1 is more efficient then compressor #2. Again operating the compressors at an equal mass flow and assuming both compressors operate with the same compression ratio, compressor #2 being less efficient than compressor #1, will operate at a higher speed than compressor #1.

Figure 1B:
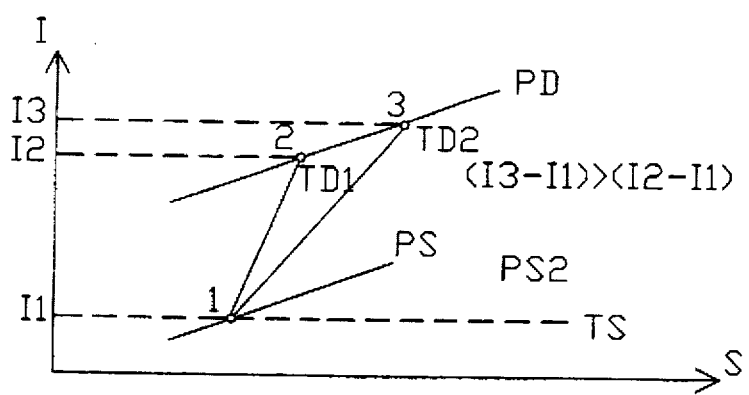
FIG. 1b is a Mollier chart (Thermodynamic Properties chart) of a gas compression process for two different efficiency compressors running in parallel with equal mass flow and equal compression ratio, i.e. Ps1=Ps2 and Pd1=Pd2.

The same compression ratio for the same mass flow for equal compressors means the same deviation from the surge. FIG. 1b shows the compression process in "i-S" (enthalpy-entropy) coordinates for compressor #1 (line 1-2) and for compressor #2 (line 1-3). With a conventional load-sharing control system, the system would not adjust the load balance because deviation from surge for each compressor is the same. However, the control process of the present invention designed to minimize the system work performed, would accelerate the most efficient compressor, the compressor #1, assuming a starting point with equal mass flow.

Figure 1C:
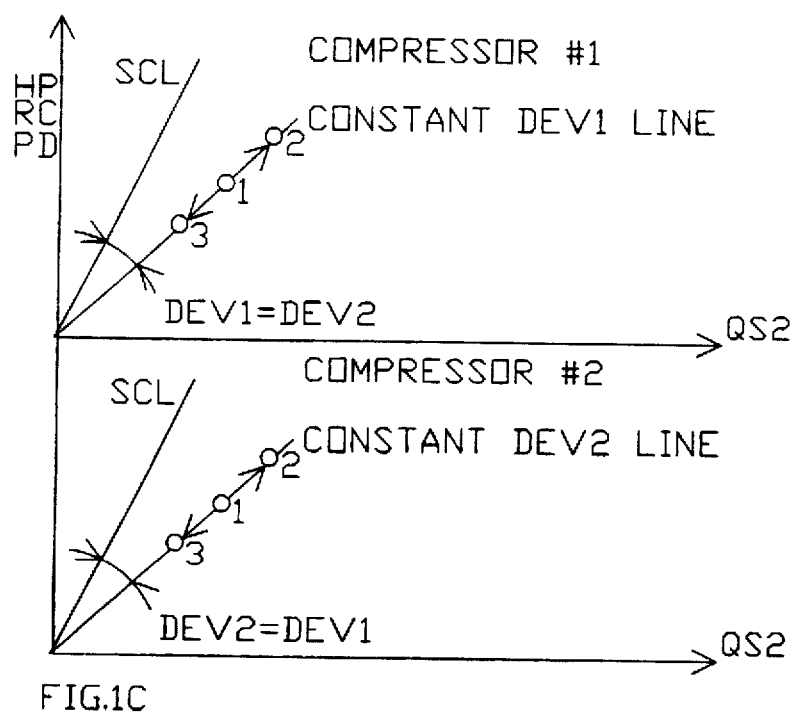
FIG. 1c shows a compressor map for each of two compressors running in parallel with equal deviation.

FIG. 1c shows typical compressor maps for two compressors operating in parallel having the same distance from their respective surge control lines (SCL). Point 1 is an initial operation point for every compressor. Operation point 2 or 3 has the same distance from the SCL and can provide the same station load as the point 1 with an increment (decrease) of mass flow through compressor #1 to increase (decrease) equal to increment of mass flow through compressor #2 to decrease (increase). The example illustrates a multiple solution for load balancing between two or more compressors operated with the same deviation from the surge control line. It works to protect compressor from surge because all of the multiple solutions are on the same deviation from surge limit, but it still fails to be used for optimization of fuel efficiency because only one solution is optimal for fuel efficiency at any time and not necessarily on the equal deviation line. Using "enthalpy"-"flow" (for parallel compressors) or "enthalpy"-"polytropic head" (for series compressors) based coordinates define the "work performed" function and gives a unique load balancing solution for minimum work performed per unit of mass flow.

Figure 2:
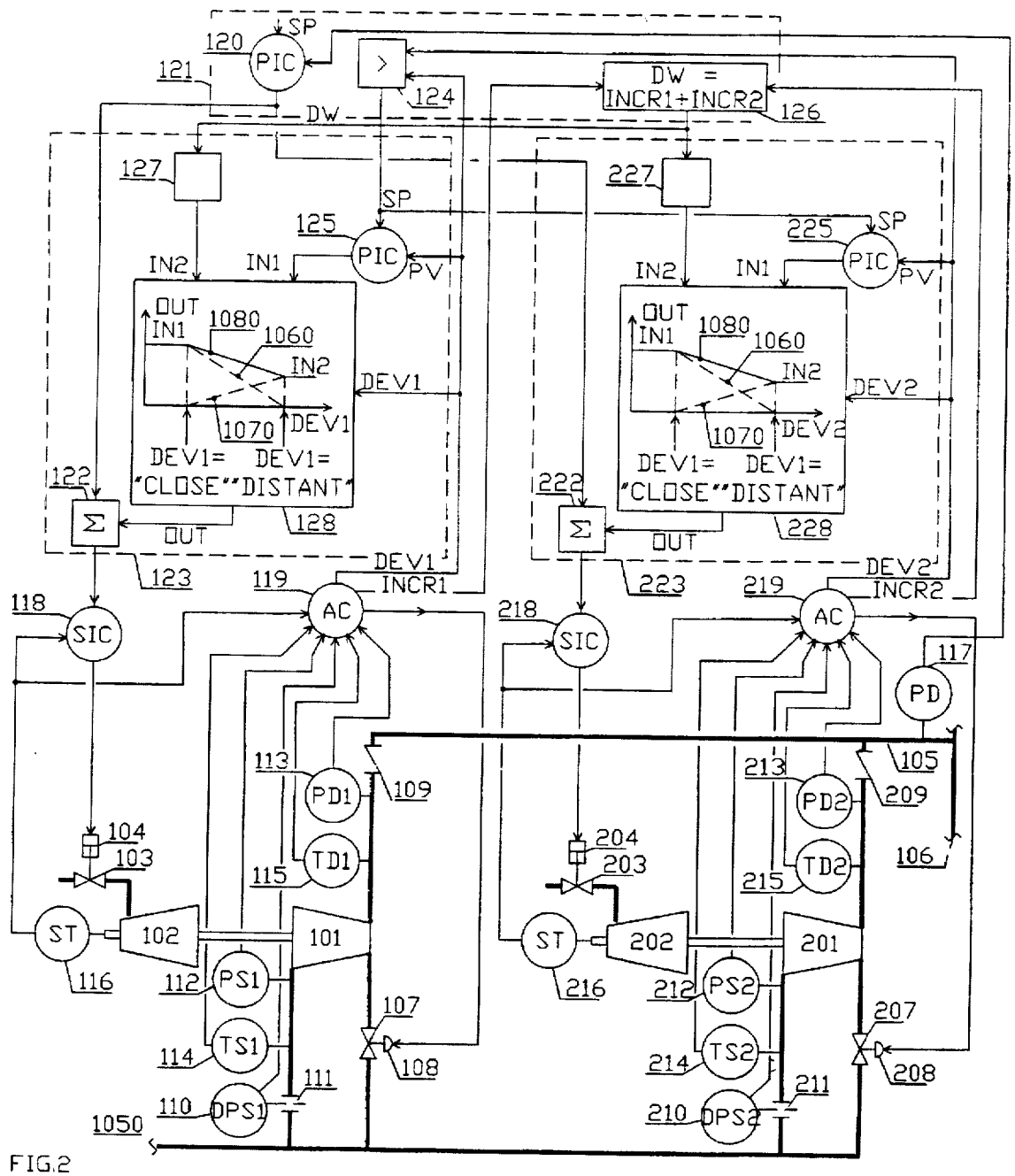
FIG. 2. is a schematic diagram of a control system for multiple parallel configured compressors in a compressor station constructed in accordance with the present invention.

Referring now to the drawings, FIG. 2 shows a compressor station with a control system including a load control loop for parallel compressors constructed in accordance with the present invention. This installation includes dynamic compressors 101, 201 working in parallel for compressing a gas. Turbine drives 102, 202 are provided for driving units 101, 201, respectively. Steam or fuel distributing means 103, 203 having actuators 104, 204 are also connected to units 101, 201, respectively.

A pipeline header 105 connects the discharge of the compressors 101, 201 with a delivery line 106 of compressed gas. The suction for each compressor 101, 201 is connected to a common line 1050. Each compressor 101, 201 is supplied with a recycle valve 107, 207 with actuators 108, 208, respectively. Each compressor 101, 201 also has a check valve 109, 209, respectively, associated therewith and being located downstream from the respective recycle valves 107, 207, respectively and upstream from the common pipeline 105.

The control system of FIG. 2 further includes differential pressure transmitters 110, 210 which measure pressure differentials across orifices 111, 211 for compressor 101, 201, respectively; pressure transmitters 112, 113 and 212, 213 which measure suction and discharge pressures for compressors 101, 201, respectively; temperature transmitters 114, 115 and 214, 215 which measure suction and discharge temperatures for compressor 101, 201, respectively; speed transmitters 116, 216 for compressors 101, 201; and a station pressure transmitter 117. The control system also includes speed governors 118, 218 which control the speed of turbines 102, 202, respectively, antisurge controllers 119, 219 which operate the recycle valves 107, 207, respectively, and system capacity or master controller 121 that generates the set points for the speed controllers 118, 218 of turbines 102, 202, respectively.

The equation of the Surge Control Line (SCL) of each compressor 101, 201, which is calculated through controllers 119, 219 is given generally by formula (1):

$$K*f(L)*Y+b=X \tag{1}$$

A distance or deviation (DEV) of each compressor 101, 201 from the SCL to the compressor's operating point is given by formula (1):

$$DEV=1-\{K*f(L)*Y+b\}/X \tag{2}$$

where:

Y and X are chosen compressor map coordinates;

K*f(L) is the variable slope of surge control line;

L is a control variable influencing the slope of surge limit, such as molecular weight, position of guide vanes, etc.

Each antisurge controller 119, 219 is designed to compute a deviation (DEV) value for each compressor. Thus, there will be a DEV value for the compressor 101 computed by the antisurge controller 119 and a DEV value for the compressor 201 computed by the antisurge controller 219.

The work performed for mass gas W for the multiple compressor station is given by formula (3):

$$W = W1 + W2 = m1 * \Delta i1/\eta 1(N1) + m2 * \Delta i2/\eta 2(N2) = m1 * Cp1 * \Delta T1/\eta 1(N1) + m2 * Cp2 * \Delta T2/\eta 2(N2) \quad (3)$$

where:

W1 and W2 are work performed values for compressors 101, 201, respectively;

$\eta 1(N1)$ and $2(N2)$ are efficiencies of turbines 102, 202, respectively;

N1 and N2 are speeds of the turbines 102, 202, respectively;

$\Delta i1$ and $\Delta i2$ are changes in enthalpy of a gas in compressor 101, 201, respectively;

Cp1 and Cp2 are specific heats at constant pressure for the gas in compressor 101, 201, respectively;

$\Delta T1$ and $\Delta T2$ are increment in temperature of the gas in compressor 101, 201, respectively; and m1=M1/(M1+M2) and m2=M2/(M1+M2) or m2=(1−m1), where M1 and M2 are mass flow through compressor 101, 102, respectively.

Cp1≡Cp2 because both compressor are operated with the same gas at about the same suction and discharge conditions. m1 and m2 are proportional mass flow through compressor 101, 102, respectively.

In order to minimize function W=f(m1, $\Delta T1$, $\Delta T2$), a change to a balance between m1 and m2 is made that still maintains (m1+m2)=1, as a function of system load requirements only. This information will in turn allow a PIC loop 120 of the master station controller 121 to control a system discharge pressure Pd or suction pressure Ps or a system mass flow "m" by changing set points for speed governors 118, 218 using summarizing modules 122, 222, respectively, of the load-sharing controllers 123 and 223, respectively.

For any particular system load in, dW/dm1 from equation (3), taking in consideration the fact that W=f(m1, $\Delta T1$, $\Delta T2$), $\Delta T1$=f(m1), $\Delta T2$=f(m1) (so long as m1+m2=1) can be given then by formula (4):

$$\begin{aligned} dW/dm1 &= \{\partial W/\partial(\Delta T1)\} * \{d(\Delta T1)/dm1\} + \\ &\quad \{\partial W/\partial(\Delta T2)\} * \{d(\Delta T2)/dm1\} = \\ &= Cp * \{[m1/\eta 1(N1)] * [d(\Delta T1)/dm1] + \\ &\quad [m2/\eta 2(N2)] * [d(\Delta T2)/dm1]\} = \\ &= Cp * (INCR1 + INCR2) \end{aligned} \quad (4)$$

where INCR1 and INCR2 are increments of W in direction $d(\Delta T1)/dm1$ and $d(\Delta T2)/dm1$, respectively.

The function W is at its minimum when dW/dm1=0, or INCR1=−INCR2, it approaches its minimum when dW/dm1<0, and moves away from its minimum when dW/dm1>0.

The antisurge controllers 119, 219 compute criterion $INCR_N$ for turbo-compressors 101, 102 and 201, 202, respectively which is given by formula (5):

$$INCR_N = [m_N/\eta(N)] * [(\Delta T_{Nn} - \Delta T_{N(n-1)})/(m1_n - m1_{(n-1)})] \quad (5)$$

where:

$m1_n$ and $m1_{(n-1)}$ are a current and previous scan, proportional mass flow for compressor #1;

$\Delta T_{Nn}$ and $\Delta T_{N(n-1)}$ are a current and previous scan temperature increment for compressor N; and $m_N$ is a current proportional mass flow for compressor N.

In some cases, as a subject of tuning, the previous scan, mass flow increment $(m1_{(n-1)} - m1_{(n-2)})$ from (5) can be substituted with the previous scan speed increment or controller output increment.

The master station controller 121 includes a high (or average) selection module 124 designed to deliver the higher, or average as an alternative, DEV as set points for both DEV balancing PIC loops 125, 225 of the load-sharing controllers 123, 223, respectively, to maintain the same distance from the surge lines, with each DEV operating for a compressor to reach the same surge displacement over a period of time, controllers 125, 225 having much slower responses than controller 120, such controllers 125, 225 having a slower response time as is known in the art. The controller 121 also includes an additional module 126 to compute the dW/dm1 value of formula (4) and its sign using the INCR1 and INCR2 values from scan data for use by "pendulum" Software modules 127, 227 of the load-sharing controllers 123, 223, respectively. The direction or sign and value of dW/dm1 computed in the module 126 has practical meaning only when an incremental change in the argument $\Delta m1$ from scan (n−1) to scan (n) causes a recognizable change in the dW/dm value of formula (4). The pendulum modules 127, 227 are designed to give an increment to m1 in a direction that will minimize W, and to provide a dynamic upset of station performance, even when dW/dm is at a minimum value (dW/dm=0) so that a dW/dm or $\Delta W/\Delta m1$ value from formula (4) will be available for data derived from the next scan.

If the data from a previous scan (n−1) resulted in an output $OUT_{(n-1)}$ of the pendulum modules 127, 227 (same value, but opposite signs) which changed the overall station performance so that $\Delta W/\Delta m1<0$, then an output $OUT_n$ of the pendulum modules 127, 227 for a current scan n will be in the same direction as the n−1 output, $OUT_{(n-1)}$. On the other hand, if $\Delta W/\Delta m1 >= 0$ for the data derived from the (n−1) scan, then the output $OUT_n$ of the pendulum modules 127, 227 for the scan n will each be in the opposite directions from the previous scan output, $OUT_{(n-1)}$. The absolute value $|OUT_n|$ is proportional to $|\Delta W/\Delta m1|$, but is subject to minimum and maximum limiting values based on the particular compressor system in which the controllers are used, as is the proportional constant.

The load sharing controllers 123, 223 are supplied with logic modules 128, 228, respectively having inputs connected to outputs of the DEV balancing PIC loops 125, 225 and the pendulum modules 127, 227, respectively. The logic modules 128, 228 receive DEV values from the antisurge controllers 119, 219, respectively. When the respective DEV value is below an arbitrary nominated deviation threshold determined for the compressor system in which the control system will be applied and in a so-called "close" condition to the SCL, the logic control modules 128, 228 cause the DEV balancing PIC loops 125, 225, respectively, to control the set points of the speed governors 118, 218, respectively, in conjunction with PIC loop 120 using the summarizing modules 122, 222, respectively. When the DEV value is above the arbitrary nominated deviation threshold determined for the compressor system in which the control system will be applied and is in a so-called "distant" condition from the SCL, the logic control modules 128, 228 cause the pendulum module 127, 227, respectively, to control the set points of the speed governor 118, 218, respectively, in conjunction with PIC loop 120, also using the summarizing modules 122, 222, respectively. The logic control modules 128, 228 are also designed to provide a smooth transition between deviation balancing and system work performed minimization of the set points of the speed governors 118, 218, respectively when the DEV value is between the arbitrary nominated deviation thresholds, i.e., between the close condition and the distant condition, the relative values of influence of In2 and In1 being shown by lines 1060, 1070, respectively, which yield the OUT value 1080, on the resultant line.

Besides being used to control and optimize the station performance where the compressors are variable speed compressors, the method of the present invention can be used to control and optimize the station performance where the compressors are constant speed electrical motor driven compressors with suction throttling valves or guide vanes. In this case, formulas (3), (4), and (5) are given by formulas (3'), (4'), and (5'):

$$W = m1*P1 + m2*P2 \quad (3')$$

$$dW/dm1 = m1*(dP1/dm1) + m2*(dP2/dm1) \quad (4')$$

$$INCR_N = m_N*[P_{Nn} - P_{N(n-1)}]/[m1_n - m1_{(n-1)}] \quad (5')$$

where:

P1 and P2 are measured electric motor power values for compressors #1 and #2, respectively; and $P_{Nn}$ and $P_{N(n-1)}$ are measured electric motor power values for compressor N for scans n and (n−1), respectively.

Figure 3:
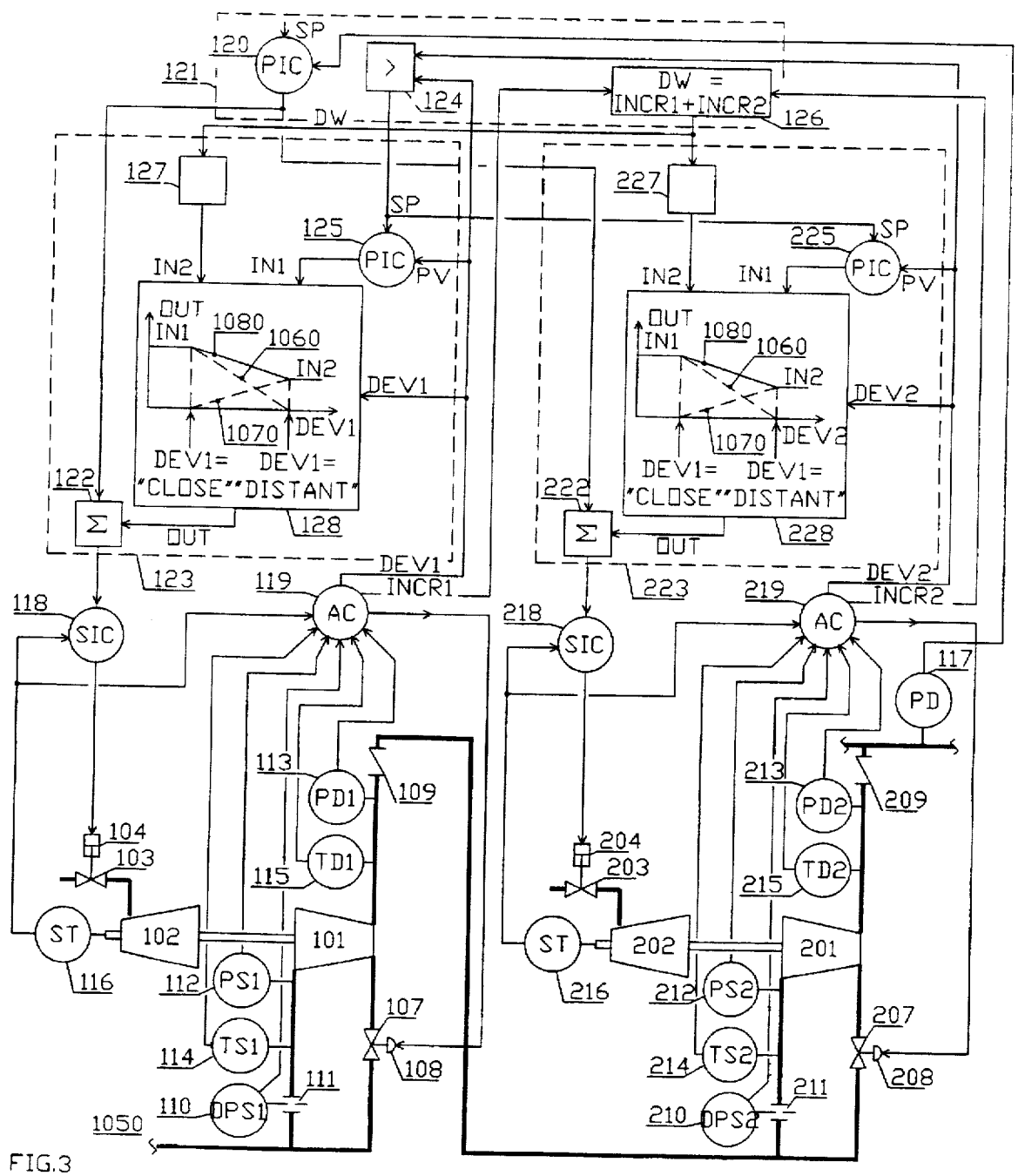
FIG. 3 is a schematic diagram of a control system for multiple series configured compressors in a compressor station constructed in accordance with the present invention.

The work performed for two compressors in series (FIG. 3) is given by the general formula (6).

$$W = W1 + W2 = m*\{Hp1/[\eta1(N1)*\eta_p1] + Hp2/[\eta2(N2)*\eta_p2]\}; \quad (6)$$

where:

W1 and W2 are work performed for the compressors 101, 201 respectively;

η1(N1) and η2(N2) are efficiencies as a function of speed of the turbines 102, 202, respectively;

N1 and N2 are speed of the turbines 102, 202, respectively;

Hp1 and Hp2 are polytropic heads from the compressors 101, 201, respectively;

$\eta_p1$ and $\eta_p2$ are polytropic efficiencies of the compressors 101, 201, respectively; and m is the mass flow through the compressors 101, 102.

It should be noted that the total polytropic head ΣHp=Hp1+Hp2 is constant for any particular system load.

The polytropic efficiency $\eta_p$ of each of the series compressors 101, 102 is given by the formula (7):

$$\eta_p = Hp/W = Z_A*\{n/(n-1)\}/\{k/(k-1)\} \quad (7)$$

where:

W is the work performed for a compressor;

Hp is a polytropic head by a compressor;

n is a polytropic constant;

k is an adiabatic, isoentropic constant; and $Z_A$ is an average compressibility factor.

The average compressibility factor $Z_A$, in general, is a function of pressure and temperature for any particular gas, and may be calculated from typical suction and discharge gas parameters and, for all practical purposes, is considered as a constant in formula (7).

The polytropic exponential factor $\sigma = (n-1)/n = \ln Rt/\ln Rc = \ln(Td/Ts)/\ln(Pd/Ps)$ is continuously calculated for the compressors 101, 102 by the antisurge controllers 119, 219, respectively based on measured discharge and suction gas temperature Td, Ts, and discharge and suction gas pressure Pd, Ps and is considered as a variable in formula (7). Isoentropic constant k which is equal to Cp/(Cp−R) is calculated from average values of specific heat at constant pressure, Cp, at suction and discharge gas temperature and the universal gas constant R and, for all practical purposes, is considered constant in formula (7).

The polytropic head Hp of each of the series compressors 101, 102 is given by formula (8):

$$Hp = Z_A*R*Ts*[(Pd/Ps)^\sigma - 1]/\sigma \quad (8)$$

The polytropic head Hp is continuously calculated for the compressors 101, 102 by the antisurge controllers 119, 219, respectively, from measured discharge and suction gas temperatures Td, Ts, and discharge and suction gas pressures Pd, Ps.

In order to minimize W, i.e., optimize an energy consumption for a station, the balance between Hp1 and Hp2 must be changed while still maintaining ΣHp+Hp1+Hp2 as a function of system load requirements only, in order to allow the PIC loop 120 of the master station controller 121 to control the system discharge pressure Pd or suction pressure Ps or mass flow "m" by changing the set points for the speed governors 118, 218 using the summarizing modules 122, 222 of the load-sharing controllers 123, 223, respectively.

For any particular system load, dW/d(Hp) can be derived from equation (6), taking into consideration the fact that W=f(Hp1, $\eta_p1$, $\eta_p2$), $\eta_p1$=f(Hp1), $\eta_p2$=f(Hp1) as shown in formula (9):

$$\begin{aligned} dW/d(Hp1) &= \{\partial W/\partial(\eta_p1)\}*\{d(\eta_p1)/d(Hp1)\} + \\ &\quad \{\partial W/\partial(\eta_p2)\}*\{d(\eta_p2)/d(Hp1)\} \\ &= m*\{[Hp2/\eta2(N2)/(\eta_p2)^2]*[d(\eta_p2)/d(Hp1)] - \\ &\quad [Hp1/\eta1(N1)/(\eta_p1)^2]*[d(\eta_p1)/d(Hp1)]\} \\ &= m*(INCR2 - INCR1) \end{aligned} \quad (9)$$

where:

INCR1 and INCR2 are the increments of W for the compressors 101, 201, respectively, in direction $d(\eta_p1)/d(Hp1)$ and $d(\eta_p2)/d(Hp2)$, respectively. According to formula (9), W is at a minimum, when dW/d(Hp1)=0, or INCR2=−INCR1, and it is approaching a minimum when dW/d(Hp1)<0 and going away from a minimum when dW/d(Hp1)>0.

The antisurge controllers 119, 219 compute the criterion $INCR_N$ for turbo-compressors 101, 102 and 201, 202, respectively, according to formula (10):

$$INCR_N = [Hp_N/\eta_N(N)/\eta_{PNn}^2]*[(\eta_{PNn} - \eta_{PN(n-1)})/(Hp1_n - Hp1_{(n-1)})] \quad (10)$$

where:

$Hp1_n$ and $Hp1_{(n-1)}$ are polytropic head values for current scan n and previous scan n−1 for a first compressor, respectively;

$\eta_{PNn}$ and $\eta_{PN(n-1)}$ are polytropic efficiency values for current scan n and previous scan n−1 for an nth compressor N;

$Hp_N$ is a current polytropic head for the nth compressor; and $\eta_N(N)$ is a turbine efficiency for the nth compressor.

For compressors operated in series, the same control devices as for compressors operated in parallel can be used.

The master station controller 121 includes the high (or average) selection module 124 which calculates set points for the deviation DEV balancing PIC loops 125, 225 of the load-sharing controllers 123, 223, respectively. It also includes of a module 126 which uses the increments INCR1 and INCR2 to compute the direction or sign and value of dW/d(Hp1) from previous scan data from the "pendulum" Software modules 127, 227 of the load-sharing controllers 123, 223, respectively. The sign and value of dW/d(Hp1) outputted from the module 126 has practical sense, only if, after an increment change in the argument $\Delta$hp1, W undergoes a recognizable change on value during a previous scan (n−1). The pendulum modules 127, 227 are designed to give an increment to m1 in a direction to minimize W, and to provide a dynamic upset to W, even when W is at a minimum value, in order to make calculation of $\Delta W/\Delta Hp1$ available for the next scan. If the optimization adjustment from a previous scan (n−1) was made in right direction, i.e., $\Delta W/\Delta Hp1 < 0$ for (n−1) scan, then output $OUT_N$ of the pendulum modules 127, 227 for the current scan n will be in the same direction as the output $OUT_{(n-1)}$ from previous scan. If $\Delta W/\Delta Hp \geq 0$ for (n−1) scan, the output $OUT_n$ of the pendulum modules 127, 227 will be opposite in directions from the output $OUT_{(n-1)}$ of previous scan. The absolute value $|OUT_n|$ will be proportional to $|\Delta W/\Delta Hp1|$, but is subject to minimum and maximum limiting value control based on the particular compressor systems in which the controllers are used, as is the proportional constant.

The load sharing controllers 123, 223 are supplied with the logic modules 128, 228, respectively, with inputs connected to outputs of the deviation balancing PIC loops 125, 225 and the pendulum modules 127, 227, respectively. The logic modules 128, 228 also receive calculated DEV values deviation criterion from the antisurge controllers 1.19, 219, respectively. The logic control modules 128, 228, respectively, cause the deviation balancing PIC loops 125, 225, respectively, to control the set points of the speed governors 118, 218, respectively, using the summarizing modules 122, 222, respectively, when the DEV values are below an arbitrary nominated deviation threshold determined for the compressor system in which the control system will be applied or are in the "close" condition and cause the pendulum modules 127, 227, respectively, to control the set points of the speed governors 118, 218, respectively using summarizing modules 122, 222, respectively, when the DEV values are is above an arbitrary nominated deviation threshold determined for the compressor system in which the control system will be applied or are in the "distant" condition. The modules 128, 228 also provide smooth transition between deviation balancing and system work performed minimizing control of the set points of the speed governors 118, 218, when the DEV values are between of the close condition and the distant condition, the relative values of influence of In2 and In1 being shown by lines 1060, 1070, respectively, which yield the OUT valve 1080, on the resultant line.

Of course, the present invention can also be used for situations having constant speed and variable speed compressors or mixtures of variable and constant speed compressors as well as stations having some compressors in parallel and some compressors in series.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A control system for optimizing the overall work performed by a compressor station having multiple compressors with associated governors and prime movers where the governors and prime movers vary the performance of each compressor, said system comprising:
   a. surge means for maintaining each of the compressor in a non-surge condition;
   b. pressure means for maintaining the station output at a desired pressure or suction;
   c. a work means for controlling performance of each compressor in the station to minimize an overall work function for the station; and
   d. control means which computes, on a periodic basis, a DEV value for each of the compressors, where each of DEV value represents a deviation from a compressor surge control line for the compressor, an INCR value for each of the compressors, where each INCR value represents an increment of the system work function based on a step upset of a mass flow balance between the compressors, and a dW value or $\Delta W$ value which represents a station differential work value derived from the INCR values from at least two periods or scans.

2. The system of claim 1, wherein one of said means adjusts the speed of each of the compressors based on the value and sign of said dW and each of said compressor's DEV values, where said dW value and sign are used to adjust each of the compressor's performance to minimize said dW and each of said compressor's DEV values is used to limit said speed adjustments so that the corresponding compressor does not go into a surge condition.

3. The system of claim 2, wherein one of said means causes said adjustments in the speed of each of the compressors to occur smoothly.

4. The system of claim 2 wherein each of the compressors includes an antisurge recycle or blow-off valve associated with the compressor and wherein said surge means, pressure means and work means form an integrated system; said system including:
   a. a plurality of antisurge control loops, one for each of the compressors in the station, to prevent the performance of each of the compressors from crossing a pre-established, safe operating condition or a pre-determined, surge control line (SCL) by activating the blow-off valve, if the operating condition of the corresponding compressor contacts or crosses-over its SCL and to compute two control criteria:
      i. the DEV value for each of the compressors; and
      ii. the INCR value for each of the compressors;
   b. an automatic pressure cascade system having:
      i. a plurality of load-sharing control loops, one for each of the compressors in the station, where each of said load-sharing control loops is designed to change the corresponding compressor's performance, which consequently, causes a change in said DEV and INCR values for the next of said periods;
      ii. a primary master station controller which establishes set points for the load-sharing control loops; and
      iii. a means for computing the dW or $\Delta W$ value; and
   c. a conditional control module for adjusting the performance of each of the compressors based on the value and sign of the dW value so that the overall work performed to the station is minimized.

5. The system of claim 4, wherein each of said load-sharing control loops has:

(1) a DEV balancing pressure control loop responsive to the corresponding DEV value;

(2) a pendulum module for determining the sign of change of the INCR component;

(3) a speed control loop for regulating the speed of said compressor, said speed control loop receiving the output from said pendulum module and said DEV balancing pressure control loop; and (4) an implementation means for receiving the outputs of said DEV balancing pressure control loop and of said pendulum module; and where said implementation means includes a logic control module which (a) determines whether the operating points of the compressors are in a "close" condition or in a "distant" condition based on said compressor's DEV value and based on that determination either (b) causes said DEV balancing pressure control loop to modify said set point for said speed control loop, which adjusts the prime mover speed, to cause the DEV value not to decrease or come closer to the SCL of that compressor, while maintaining the overall discharge pressure when the DEV value is in the close condition, or (c) causes said pendulum module to modify said set point of the speed control loop, which adjusts the prime mover speed, so that the absolute value of ΔW decreases, while maintaining the overall discharge pressure, when the DEV value is in the distant condition, or (d) adjusts the compressor performance smoothly as a combination of the outputs of said DEV balancing pressure control loop and pendulum module, when the DEV value is between the close and distant conditions.

6. The system of claim 1, wherein the compressors are in parallel.

7. The systems of claim 1, wherein the compressors are in series.

8. The system of claim 1, wherein the compressors associated prime movers are constant speed electric motors and wherein the control means derive the INCR value from a measured electric motor power value for each compressor and the dW value from the polytropic head value and the electric motor power value for each compressor.

9. The system of claim 1, wherein the compressors associated prime movers are variable speed turbines or electric motors and wherein the control means derive the INCR value from a turbine efficiency and a temperature increment for each compressor and the dW value from the turbine efficiency and the temperature increment for each compressor.

10. A method for optimizing the overall work performed of a compressor station having multiple compressors, comprising the steps of:

a. computing, on a periodic basis, for each of the compressors in the station, a DEV value which represents a deviation from a compressor surge control line and an INCR value which represents an increment of a system work performed, and, for the station, a dW value or ΔW value which represents a station differential work value derived from the INCR values from at least two periods or scans; and b. adjusting the operation of each of the compressors of the station based on the value and sign of dW and each compressor's DEV value to cause the absolute value of dW to decrease, while maintaining each of the compressors in a non-surge operating condition.

11. The method of claim 10, further comprising the step of:

c. upsetting the operation of each compressor when the dW value is at or near zero so that a dW value can be computed at each scan.

12. The method of claim 10, wherein the compressors are in parallel.

13. The method of claim 11, wherein the compressors are in series.

14. The method of claim 10, wherein the compressors associated prime movers are constant speed electric motors and wherein the control means derive the INCR value from a measured electric motor power value for each compressor and the dW value from a polytropic head value and the electric motor power value for each compressor.

15. The method of claim 10, wherein the compressors associated prime movers are variable speed turbines or electric motors and wherein the control means derive the INCR value from a turbine efficiency and a temperature increment for each compressor and the dW value from the turbine efficiency and a temperature increment for each compressor.

* * * * *